United States Patent
Nakamura et al.

(10) Patent No.: US 7,047,088 B2
(45) Date of Patent: May 16, 2006

(54) MANAGEMENT SYSTEM FOR DEVICES CONNECTING WITH NETWORK

(75) Inventors: Junichi Nakamura, Nagano-ken (JP); Akio Murata, Nagano-ken (JP); Tsunemori Asahi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 382 days.

(21) Appl. No.: 09/979,272

(22) PCT Filed: May 26, 2001

(86) PCT No.: PCT/JP01/02449

§ 371 (c)(1),
(2), (4) Date: Nov. 21, 2001

(87) PCT Pub. No.: WO01/73558

PCT Pub. Date: Oct. 4, 2001

(65) Prior Publication Data

US 2002/0161740 A1    Oct. 31, 2002

(30) Foreign Application Priority Data

Mar. 27, 2000  (JP) .............................. 2000-086517

(51) Int. Cl.
*G05B 11/01*  (2006.01)

(52) U.S. Cl. ......................... 700/19; 709/220; 709/221; 709/222; 709/223; 358/1.15

(58) Field of Classification Search .................... 700/1, 700/17, 19, 20, 83; 709/226, 220–223; 345/700; 358/1.9, 1.15; 707/1, 102; 710/8, 106, 128; 713/1

See application file for complete search history.

(56) References Cited

U.S. PATENT DOCUMENTS

| | | | |
|---|---|---|---|
| 5,323,393 A * | 6/1994 | Barrett et al. ................ 370/449 |
| 5,692,111 A * | 11/1997 | Marbry et al. .............. 358/1.15 |
| 5,717,439 A | 2/1998 | Levine et al. |
| 5,742,286 A * | 4/1998 | Kung et al. .................. 345/839 |
| 5,832,191 A * | 11/1998 | Thorne ...................... 358/1.15 |
| 5,898,823 A * | 4/1999 | Sorkin et al. .............. 358/1.15 |
| 5,960,167 A * | 9/1999 | Roberts et al. ............. 358/1.15 |
| 6,054,987 A | 4/2000 | Richardson |

(Continued)

FOREIGN PATENT DOCUMENTS

EP    0 948 161    10/1999

(Continued)

OTHER PUBLICATIONS

U.S. Appl. No. 10/638,294, filed Aug. 2003, Nakamura et al.

*Primary Examiner*—Anthony Knight
*Assistant Examiner*—Ronald D. Hartman, Jr.
(74) *Attorney, Agent, or Firm*—Oliff & Berridge, PLC

(57) ABSTRACT

The object of the present invention is to relieve the load of management of devices connecting with a network.

The technique of the present invention registers classification of printers connecting with a network LAN into at least one group, and specifies target printers, which are objects of management, by the unit of registered group. Operation setting data is generated in any of three applications; 'Input', 'Obtain operation setting information from any model printer on the network', and 'Utilize default setting data', and is output to the printers belonging to the specified group. This arrangement enables the operation setting of multiple printers to be carried out collectively, thus effectively relieving the load in management.

5 Claims, 11 Drawing Sheets

U.S. PATENT DOCUMENTS

| | | | |
|---|---|---|---|
| 6,067,407 A * | 5/2000 | Wadsworth et al. | 709/224 |
| 6,112,256 A * | 8/2000 | Goffinet et al. | 710/8 |
| 6,122,639 A | 9/2000 | Babu et al. | |
| 6,182,225 B1 * | 1/2001 | Hagiuda et al. | 713/201 |
| 6,349,304 B1 * | 2/2002 | Boldt et al. | 707/102 |
| 6,466,972 B1 | 10/2002 | Paul et al. | |
| 2002/0049693 A1 * | 4/2002 | Gase | 707/1 |
| 2002/0133573 A1 * | 9/2002 | Matsuda et al. | 709/220 |

FOREIGN PATENT DOCUMENTS

| | | |
|---|---|---|
| JP | 10-294745 | 11/1998 |
| JP | 11-282786 | 10/1999 |
| JP | 11-353145 | 12/1999 |
| JP | 2000-78169 | 3/2000 |

* cited by examiner

Setting Data on Common Conditions

| Header Information |
|---|
| Condition 1 |
| Object : Paper Size |
| Setting : AUTO |
| : |
| Condition 2 |
| Object : Toner Save Mode |
| Setting : ON |
| : |

PRT1

PRT2

Setting Data on Type-Dependent Conditions

| Header Information |
|---|
| Condition 1 |
| Object : Avoid Paper Error |
| Setting : ON |
| : |

PRT3

MANAGEMENT SYSTEM FOR DEVICES CONNECTING WITH NETWORK

TECHNICAL FIELD

The present invention relates to a management system for devices connecting with a network.

BACKGROUND ART

With recent spread of LANs (Local Area Networks), a plurality of computers connecting with the network share one or multiple printers connecting with the network. The user operates a computer connecting with the network, selects a printer as an output resource, and supplies a print job to the selected printer, so as to implement printing via the network. In such a printer-sharing configuration, there is generally a manager who manages the operations of these printers. The manager manages the working status of the respective printers, handles any abnormalities and troubles, and manages the user's authentication of access to the respective printers. Such management is performed with a management computer connecting with the network.

In general, various working conditions, such as selection of paper and adjustment of printing density, are set in the printer. The working conditions may be set via a network by means of a management computer or by means of a console in the printer main body.

In the system where a large number of users share printers connecting with the network, each user may change the settings in a printer according to the user's own requirements for printing. This differentiates the settings in the respective printers. Because of such difference in settings, resulting prints may be different from expected prints. The user should accordingly change the settings and carry out the printing operation again. This damages the utility of printers. It is possible that the manager performs management to keep the settings of each printer in a preset standard state. In the system with a large number of printers, such arrangement requires a significant load and makes it extremely difficult for the manager to carry out the sufficient management. When printers are shared in an office, different sections may desire different settings. In such cases, the manager is required to perform extremely complicated management.

The above description specifically regards the printer, but similar problems arise commonly in devices usable on the network. These problems are also found in the process of monitoring the working status of each device, as well as in the process of setting the working conditions.

DISCLOSURE OF THE INVENTION

The object of the present invention is thus to provide a technique that relieves a load in management of working conditions of devices connecting with a network.

In order to attain at least part of the above and the other related objects, the present invention is directed to a management system that manages working conditions of multiple devices connecting with a network. The management system includes: a target device specification module that specifies a plurality of target devices, which are objects of management of the working conditions, among the multiple devices; a setting module that sets management control information for obtaining or setting the working condition of each of the target devices; and an operation management module that outputs the management control information to each of the target devices via the network and collectively obtains or sets the working conditions of the plurality of target devices.

Specification of each target device may utilize, for example, a path for specifying each device on the network or an address according to a communication protocol on the network. The procedure successively outputs the management control information to the specified target devices, in order to collectively obtain or set the working conditions of the target devices. When the protocol allows communication that collectively outputs the management control information to a plurality of specified devices, such communication may be applied to collectively obtain or set the working conditions. For example, when all the devices on the network are target devices in the TCP/IP protocol, broadcast communication may be utilized to output the management control information.

The management system of the present invention collectively obtains or sets the working conditions of the specified target devices. This arrangement ensures total management with a relatively light load even in the case of an increase in number of target devices. The technique of the present invention is thus attained as any of the management system that carries out only the collective acquisition of the working conditions, the management system that carries out only the collective setting, and the management system that carries out both the collective acquisition and the collective setting.

The target devices may be specified individually among the devices on the network. In accordance with one preferable application, however, the management system further has a group setting module that classifies the multiple devices on the network into at least one preset group and stores the classification, wherein the target device specification module specifies the plurality of target devices by a unit of each group.

This arrangement allows management of the devices by the unit of each group, thus further relieving the load in management. For example, when there are different classes of devices on the network, which are expected to be actuated in different settings of working conditions, grouping the devices having the common settings of working conditions facilitates the management of the working status of the respective devices. Each device may be included in one single group or in a plurality of different groups. The latter arrangement ensures diverse settings and flexible services according to various requirements. For example, a certain device may be used in the settings of a group A in some cases and used in the different settings of another group B in other cases.

The presence of a detection module for automatically detecting the devices on the network further enhances the utility and allows management of all the devices without any exclusions. A diversity of known techniques may be applicable for detection of the devices.

In the management system of the present invention, when the plurality of target devices include different classes of devices having different obtainable or settable conditions, it is preferable that the operation management module outputs a part of the management control information regarding a condition common to all the plurality of target devices separately from a residual part of the management control information regarding a residual non-common condition.

The respective devices have different operations when receiving the management control information regarding the unobtainable or non-settable conditions. In some cases, the communication itself to a device may be in an error state. In such cases, no working conditions are obtained or set although the device has some obtainable or settable conditions. In order to prevent such errors, one applicable method extracts only the settable conditions with regard to each device and outputs the extracted conditions as the management control information. This, however, makes the processing undesirably complicated. In the above arrangement, the conditions common to the respective devices are output separately from the device-dependent conditions. This enables the working conditions of the respective devices to be obtained or set stably by the relatively simple process.

There are two major cases in which devices having different settable conditions are mixed. In the first case, there are devices having an identical main function but different types. For example, various types of printers are connected to the network. In the second case, there are plural classes of devices having different main functions. For example, printers and displays are both connected to the network.

The main function represents the main operation or application of each device. For example, image input devices having different main functions include digital cameras mainly functioning to shoot still pictures, scanners mainly functioning to optically read still pictures, and video cameras mainly functioning to shoot moving pictures. Image output devices having different main functions include printers mainly functioning to print still pictures, displays and other display devices mainly functioning to display images, and projectors mainly functioning to project and display images.

In the structure with different classes of devices having different settable conditions, the common conditions include a setting on communication via the network and a setting on time for defining an operation of each device.

A diversity of methods may be applied to extract the common conditions. One applicable method enumerates the settable conditions with regard to the respective devices specified as the objects of management and automatically extracts the common conditions. Another applicable method extracts the conditions commonly settable for all the devices from a list of common conditions prepared in advance by the manager. The former method advantageously relieves the load of the manager. The latter method advantageously allows arbitrary selection of the common conditions by taking into account the intention of the manager.

In accordance with one preferable application of the management system of the present invention, the setting module inputs setting information used for setting a working condition of each of the target devices, and the operation management module collectively sets operations of the plurality of target devices, based on the setting information. This application is used for setting the working conditions of the respective devices on the network. The total management of the devices is especially effective in the process of setting the working conditions.

In the management system that carries out the operation setting of the devices, the manager may input the setting information or the setting module may input the setting information from one device arbitrarily selected on the network.

This application selects a model device on the network and copies the information on the settings of the model device into each of the other target devices. This arrangement enables the setting information to be readily set in each device. Selection of a device that has actually worked and been confirmed to have the adequate settings as the model device readily attains the adequate setting. All the setting information may be obtained from the model device. Alternatively only part of the setting information may be obtained from the model device, while the setting information with regard to the residual conditions may be input separately.

In one preferable application of the present invention, the management system further has a standard setting storage module that stores setting information arbitrarily set in advance with regard to the selected device, wherein the setting module inputs the setting information from the standard setting storage module.

This application stores the setting information as default values, and enables the working conditions of each device to be set readily. The default values may be common to all the devices or common to each group if the devices are grouped. The default values may be stored with regard to all the working conditions or only part of the working conditions.

In accordance with one preferable embodiment, the management system that carries out the operation setting of the devices further includes: a setting status detection module that determines whether or not the operation setting by the operation management module is normally concluded; and an information module that informs a user of a device in which the operation setting is not concluded normally. The information may be given by a display, a sound, or any other suitable means.

This arrangement ensures the adequate operations setting of the device and enables the abnormally concluded devices to be readily reset. The resetting operation may be carried out via the network or may be performed directly with a console of the device.

In the structure of resetting via the network, the management system further includes: an input module that receives a command showing whether or not execution of resetting is required with regard to a device in which the operation setting is not concluded normally; and a resetting control module that, in response to input of a resetting execution command, controls the operation management module to output the setting information to the device in which the operation setting is not concluded normally.

In accordance with another preferable embodiment, the management system that carries out the operation setting of the devices further includes: a setting status detection module that determines whether or not the operation setting by the operation management module is normally concluded; and a resetting control module that iteratively causes the operation management module to output the setting information to the device in which the operation setting is not concluded normally and causes the setting status detection module to carry out the detection under a predetermined condition.

The structure of this embodiment automatically carries out the resetting operation while there is any device in which the operation setting is abnormally concluded. The 'predetermined condition' may be, for example, that there are no abnormally concluded devices or that the resetting is carried out in a preset time period or in a preset number of times, although these conditions are not restrictive in any sense.

In accordance with still another preferable embodiment, the management system that carries out the operation setting of the devices further includes: a detection module that detects a working condition of each of the target devices; and a settings maintenance module that, when there is any abnormal setting device having a working condition different from a working condition corresponding to the setting information, controls the operation management module to output the setting information to the abnormal setting device.

This arrangement enables the working conditions of each device to be restored to a preset state with little load. It is highly probable that the user changes the settings of working conditions in a device after the collective settings of operations in the respective devices. In such cases, the device is detected as the abnormal setting device having the different working conditions from the predetermined setting information. Here the abnormal setting device does not mean any failure, but represents a device under working conditions different from the originally expected working conditions. The structure of the above embodiment detects the abnormal setting device and resets the working conditions of the detected abnormal setting device. It is preferable that the detection module and the settings maintenance module are periodically executed at certain time intervals, in order to adequately maintain the working conditions. It is also preferable that the management system has a module for automatically executing the detection and the settings maintenance at regular intervals.

The management system of the present invention may be utilized to manage diverse devices, for example, various output devices including printing apparatuses usable on the network, displays usable on the network, and recording devices into CD-Rs and other media. The diverse devices also include various input devices, such as scanners usable on the network, flexible disks, and CD-Rom drives, as well as network equipment like routers.

The management system of the present invention may be actualized, for example, by a computer connecting with the network. It is not necessary that the diverse modules discussed above are attained by one single computer, but these modules may be attained by a plurality of computers working in connection with one another. The respective modules may not be actualized by the computer but may be constructed as special units.

The technique of the present invention may be attained by an interface used for the management as discussed below. Although the interface is generally actualized on a display of the computer by the software, each interface may be constructed by the hardware as a specific input-output device.

The present invention is thus directed to a first interface that is used to specify a plurality of target devices, for which working conditions are collectively obtained or set, among multiple devices connecting with a network. The interface includes: a group display module that displays classification of the multiple devices on the network into at least one preset group; and a device specification module that receives an input for specifying the plurality of target devices by a unit of each group.

This interface enables target devices as objects of management to be readily specified by the unit of a group, thus enhancing the utility of the management system. From the viewpoint of the enhanced utility, it is preferable that the interface is also used as an interface for registering devices into groups.

The present invention is also directed to a second interface that is output to multiple devices connecting with a network and is used to set management control information for obtaining or setting a working condition of each device, wherein a condition common to the multiple devices is displayed in a distinctive manner from a device-dependent condition.

This interface enables the common conditions to the respective devices to be readily distinguished from the device-dependent conditions, thus enhancing the utility of the management system.

It is not necessary to individually construct the first interface and the second interface, but a composite interface may be constructed. The technique of the present invention is not restricted to such interfaces but is applicable to a diversity of other interfaces.

The technique of the present invention is actualized by a diversity of applications other than the management system and the interface discussed above. The present invention may be directed to a method of managing devices connecting with a network, as well as programs that cause a computer to attain the management system and the interface discussed above, signal forms equivalent to such programs, and recording media in which such programs are recorded. Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

BEST MODES OF CARRYING OUT THE INVENTION

Figure 1:
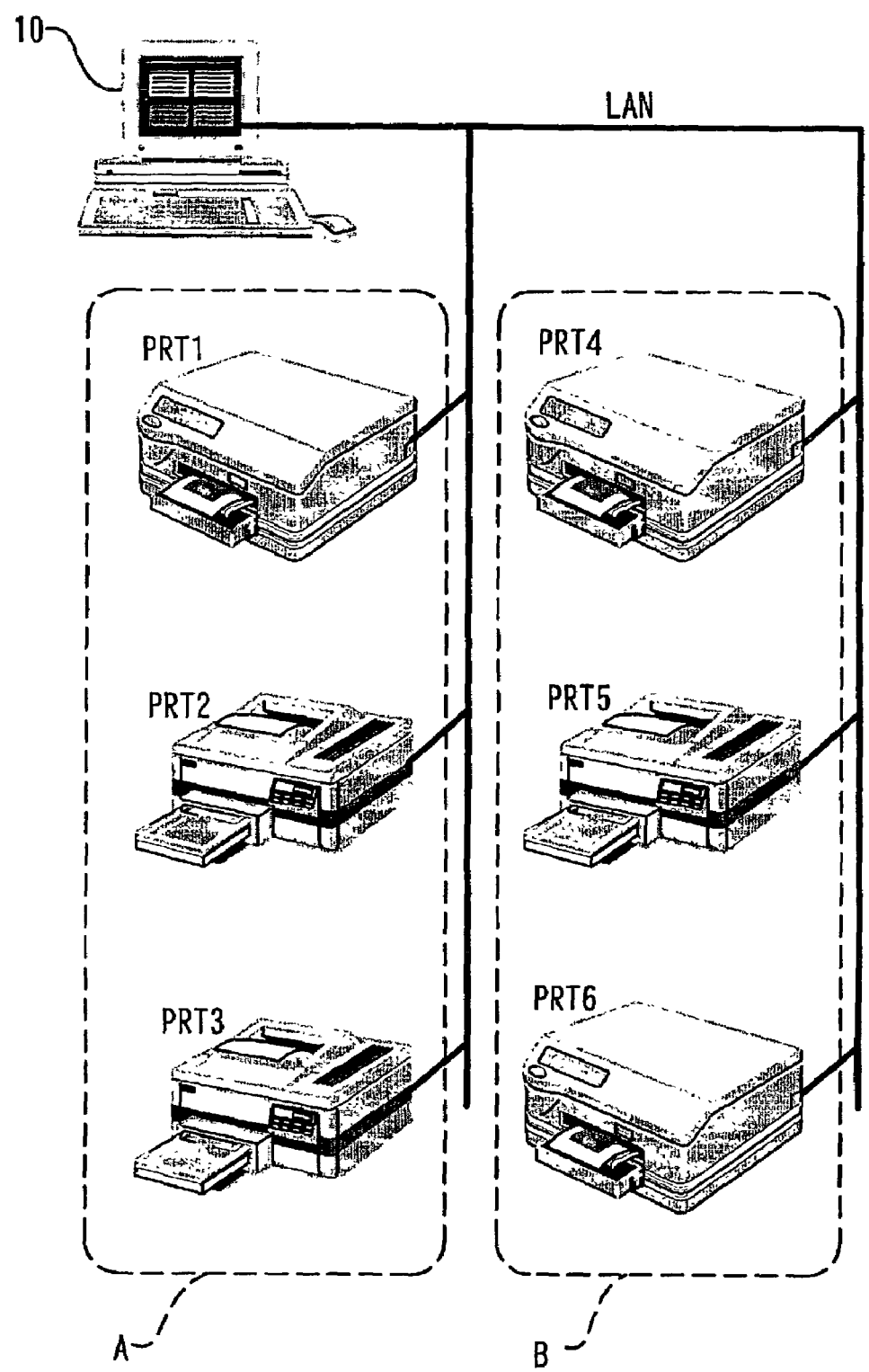
FIG. 1 illustrates the configuration of a network system including a management system 10 in one embodiment of the present invention.

Management systems are discussed below as preferable embodiments of the present invention in the following sequence:
 A. Configuration of System
 B. Operation Setting Process
 C. Modified Example
 D. Second Embodiment
 E. Third Embodiment A. Configuration of System FIG. 1 illustrates the configuration of a network system including a management system 10 in one embodiment of the present invention. The management system 10 is constructed by software on a general-purpose computer. As illustrated, in this network system, the management system 10 as well as six printers PRT1 to PRT6 are connected to a local area network LAN. A large number of non-illustrated client computers are also connected with the network. Each user selects a printer as an output resource among the printers PRT1 to PRT6 connecting with the network and supplies a print job from a client computer to the selected printer to implement printing.

Figure 2:
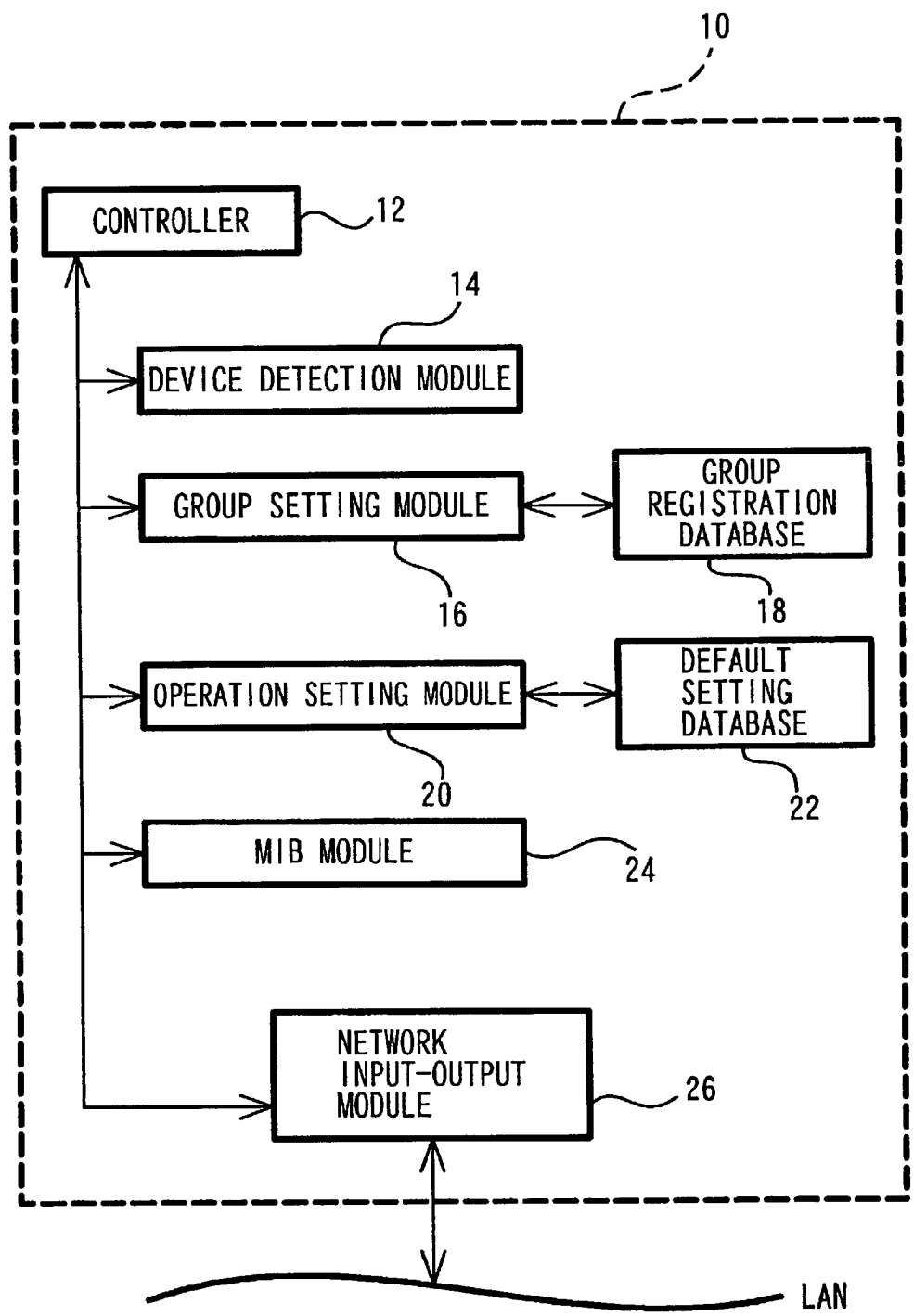
FIG. 2 shows functional blocks of the management system.

The manager of the network system utilizes the management system 10 to manage the operations of the printers PRT1 to PRT6. FIG. 2 shows functional blocks of the management system. As mentioned above, the management system is constructed by software on a general-purpose computer, so that the respective functional blocks are attained by the software.

As illustrated in FIG. 2, the management system has a controller 12 that controls the whole system. A device detection module 14, a group setting module 16, an operation setting module 20, an MIB module 24, and a network input-output module 26 are functional blocks functioning under control of the controller 12. The management system also includes a group registration database 18 registered and referred to by the group setting module 16 and a default setting database 22 registered and referred to by the operation setting module 20.

The following describes the functions of the respective functional blocks. The device detection module 14 functions to detect target devices that are connected to the network and are objects of management by the management system 10. The objects of management by the management system 10 of the embodiment are printers, so that the device detection module 14 detects the printers PRT1 to PRT6 (see FIG. 1) connecting with the network. A diversity of techniques may be adopted to detect the printers. One applicable method outputs a preset signal onto the network in a broadcasting manner and identifies the class of each device and its address on the network based on the responses to the preset signal.

The group setting module 16 functions to group the detected target devices and register the grouped target devices into the group registration database 18. When the target devices are specified as a group by an operation setting process discussed later, the group setting module 16 refers to the group registration database 18 and individually specifies the target devices belonging to the specified group. This is described concretely with reference to the example of FIG. 1. As mentioned previously, the six printers PRT1 to PRT6 are connected to the network system of this embodiment. In the network system constructed on an office, the six printers may be located in different sections. In such cases, from the viewpoint of convenience, management of the printers by the respective sections is desirable. It is accordingly preferable to classify the printers into groups and register the classification. The group setting module 16 and the group registration database 18 thus function to manage mapping of the printers to each group set by the manager. In the example of FIG. 1, the printers PRT1 to PRT3 are registered as a group A, and the printers PRT4 to PRT6 as a group B. The manager may arbitrarily set the number of groups and the type of printers included in each group. The group setting module 16 generates mapping data, which represents mapping of the respective printers to the group names, and registers the mapping data into the group registration database 18.

Figure 3:
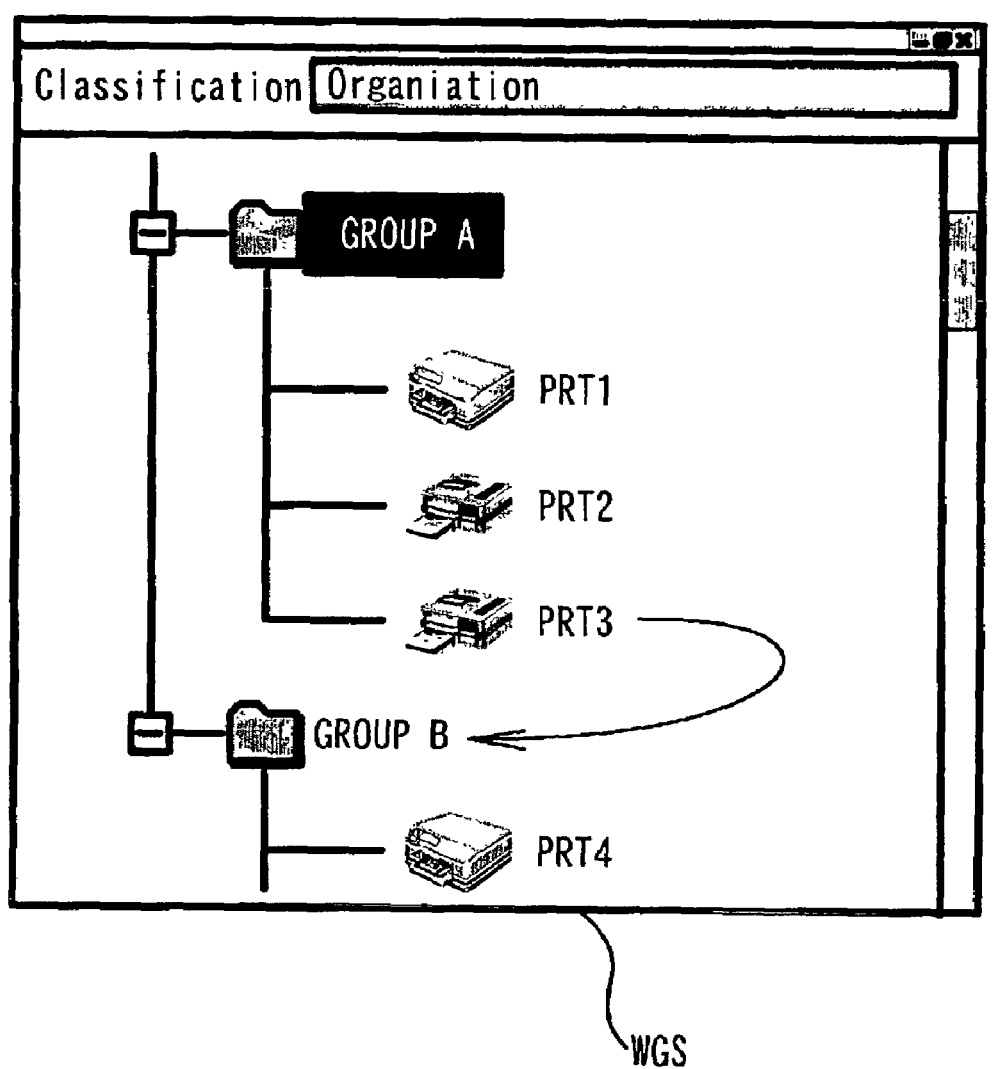
FIG. 3 shows an interface used for group setting.

The group setting module 16 also functions to supply the manger with an interface used for grouping of devices. FIG. 3 shows an interface used for the group setting. A window WGS is open on a display of the management system 10. The window WGS includes the printers PRT1 to PRT6 connecting with the network and their groups, which are displayed in a tree with corresponding icons. In the example of FIG. 3, the printers PRT1 to PRT3 belonging to the group A and part of the printers (PRT4) belonging to the group B are shown. All the printers included in the group B are displayable by a scroll of the window. Printers that have not been registered as members of any groups are shown at the same hierarchical level as that of the icons representing the groups A and B on the interface shown in FIG. 3. When the manager moves or drags and drops the icon representing the printer PRT3 belonging to the group A onto the group B as illustrated, the printer PRT3 is included in the group B. The structure of this embodiment allows one printer PRT to be included in a plurality of groups. For example, the printer PRT3 may be registered in both the groups A and B by copying the icon of the printer PRT3 in the group B.

The groups may be registered in a plurality of different ways. The results of registration are based on the classification. FIG. 3 shows groups registered under the name 'Organization'. Diverse group settings may be registered independently; in another example different from the illustration, a group including the printers PRT1, PRT3, and PRT5 and another group including the printers PRT2, PRT4, and PRT6. The interface shown here is not restrictive but only illustrative. Any of diverse interfaces may be applicable to display the mapping of printers connecting with the network to each group as well as to register the mapping and modify the registration.

Referring back to FIG. 2, the other functional blocks are described. The operation setting module 20 functions to set the working conditions of the printers PRT1 to PRT6. Each printer transmits a preset control signal via the network to set the working conditions, for example, the selected paper for printing and the adjusted printing density. More specifically, the operation setting module 20 generates data used for setting the working conditions of the respective printers. The operation setting process is carried out mainly in three arrangements. In the first arrangement, the manager individually specifies the settings regarding the respective working conditions. The second arrangement utilizes preset data representing default settings. In the second arrangement, the operation setting module 20 refers to the default setting database 22 to generate data for the operation setting. The operation setting module 20 also functions to register the data on the default settings into the default setting database 22. The third arrangement selects one of the printers connecting with the network as a model printer, collects setting information of the model printer, and generates the data used for the operation setting. In the third arrangement, the operation setting module 20 functions to collect the setting information of the model printer and generate the data used for the operation setting based on the collected setting data. The operation setting module 20 also functions to supply the manager with an interface for the operation setting.

Figure 4:
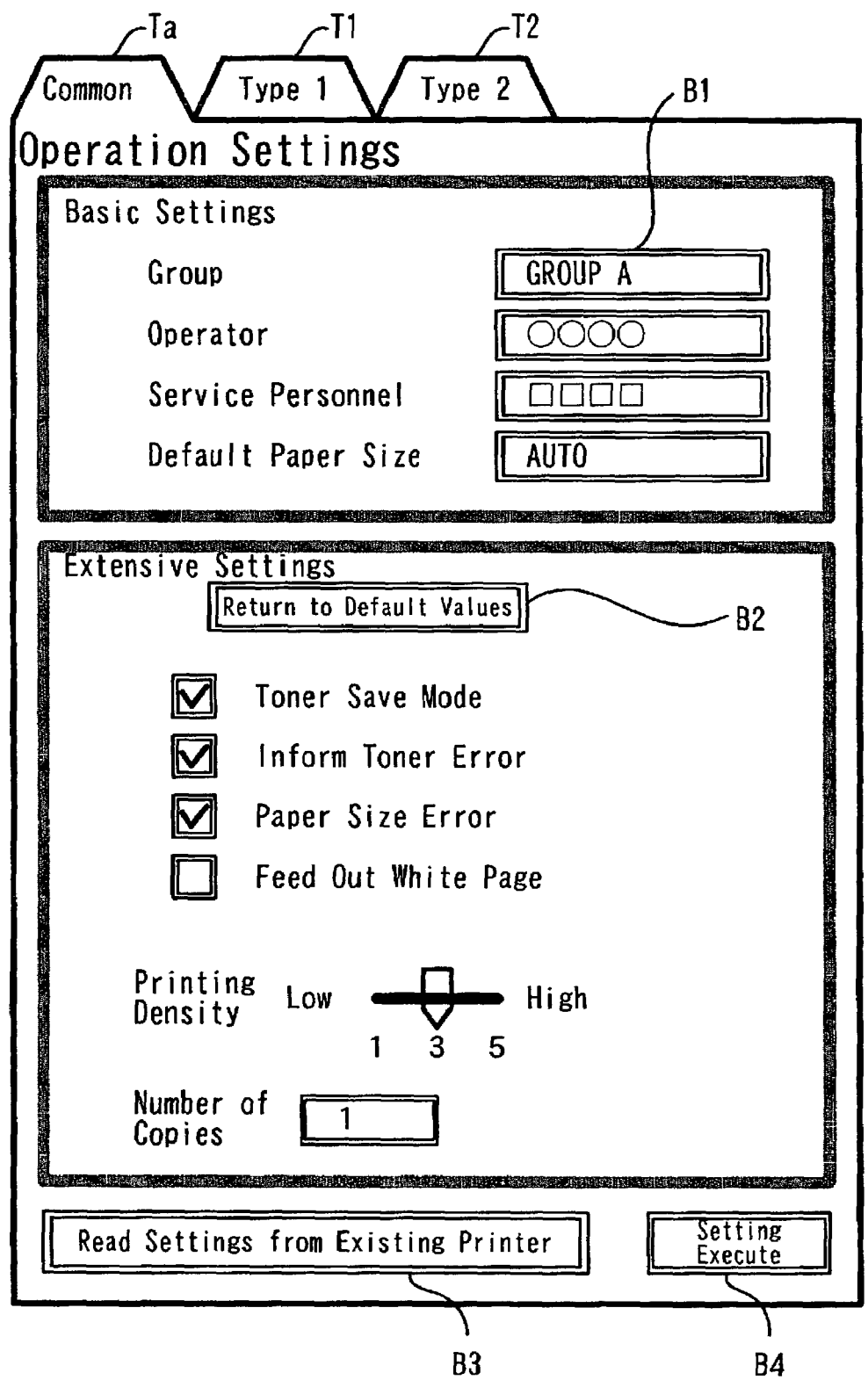
FIG. 4 illustrates an interface for operation setting.

FIG. 4 illustrates an interface for the operation setting. This interface is open on the display of the management system 10. The printers PRT1 to PRT6 connecting with the network may not be an identical type but may be different types. In this embodiment, as shown in FIG. 1, the printers PRT1, PRT4, and PRT 6 are of one identical type, while the printers PRT2, PRT3, and PRT5 are of another identical type. Different types of printers have different settable items and non-settable items. There are some items common to the respective printers. The interface for the operation setting in this embodiment is designed to carry out setting of the working conditions by taking into account the difference in type of the printer.

As illustrated, the interface for the operation setting has a dialog for setting conditions common to the respective printers and dialogs for setting conditions depending upon the respective types of the printers. The changeover among the respective dialogs is effected by clicking a desired one of a 'Common' tab Ta and tabs T1 and T2 for the respective types of the printers with a pointing device, such as a mouse.

The dialog for setting the common conditions is mainly divided into two areas. The first area is a basic settings area, in which basic pieces of information are set; for example, a target group as the object of the operation setting, an operator, a service personnel, and a default paper size. The target group as the object of the operation setting has been set previously by the group setting module 16. For example, in the case where 'Group A' is input into an input box B1, the operation setting is carried out with regard to the printers PRT1 to PRT3 belonging to the group A (see FIGS. 1 and 3 for the members of each group). In the case where 'Group B' is input, the operation setting is carried out with regard to the printers PRT4 to PRT6. In the case where both Group A and Group B are input, the operation setting is carried out with regard to all the printers PRT1 to PRT6. The target printer as the object of the operation setting may be specified individually in the group input box B1, instead of by the unit of a group. Input of the printer 'PRT1' in the input box B1 enables the operation setting of the printer PRT1 to be carried out individually, irrespective of the mapping of the printer to the group.

The second area is an extensive setting area, in which detailed working conditions are set. In this embodiment, typical working conditions to be set include the on-off state of items 'Toner Save Mode', 'Inform Toner Error', 'Paper Size Error', and 'Feed Out White Paper', the adjustment of printing density, and the number of copies. In a first application, the manager individually specifies the settings through preset operations. The on-off state of the respective items is specified by checking or non-checking check boxes corresponding to the respective items. The printing density is specified by shifting a slider leftward or rightward with a pointing device. The number of copies is specified by directly inputting a desired number.

A second application specifies preset default values as the settings in the extensive setting area. A button B2 'Return to Default Values' included in the extensive setting area is clicked to activate the second application. In response to the click of the button B2, the setting data registered in the default setting database 22 in the management system 10 are displayed in the extensive setting area.

A third application selects one of the printers on the network as a model printer and specifies the settings of the model printer as the settings in the extensive setting area. A button B3 'Read Settings from Existing Printer' is clicked to activate the third application. In response to this operation, the setting information of the model printer registered in advance is read via the network and displayed in the extensive setting area. The model printer is registered in advance on the interface discussed above with FIG. 3. A modified procedure opens the interface shown in FIG. 3 for selection of the model printer in response to a click of the button B3. Any suitable interface other than that shown in FIG. 3 may be used for selection of the model printer.

In the structure of this embodiment, the items of the basic settings (for example, the group and the operator) and the items of the extensive settings (for example, the toner save mode) included in the common conditions are selected in advance by the manager. The management system 10 compares the items selected by the manager with the items settable in each printer specified as the object of management. The items settable in all the printers among the selected items are displayed on the interface as illustrated in the display of FIG. 4. The items that are not settable in all the printers are eliminated from the area of the common conditions Ta or are displayed in a distinctive manner that allows recognition of the non-settable state, such as gray-out display.

The procedure of this embodiment specifies the common conditions by reflecting the manager's requirements. In another possible application, the management system 10 searches for the items settable in the respective printers as the objects of management and mechanically extracts the settable items common to all the printers, so as to specify the common conditions.

The printer-dependent conditions may be set individually after a click of the tab T1 or T2 to change over the display to the corresponding dialog. The display and the setting method similar to those for the common settings are applied for the printer-dependent settings with some difference in available conditions, and are thus not specifically described here. After setting the working conditions on the interface, a click of a 'Setting Execute' button B4 outputs the settings to each of the target printers specified in the input box B1. This actually executes the operation setting.

Referring back to FIG. 2, the other functional blocks are described. The MIB module 24 functions to mediate transmission of information between the respective functional blocks discussed above and the printers on the network. In general, a database called an MIB (Management Information Base) is used to obtain and set the working conditions of printers. Each of the working conditions of each printer is stored at a preset address allocated to the working condition in the MIB provided in the internal memory of the printer. The management system 10 specifies the preset MIB address and obtains and rewrite the data, thereby obtaining and setting the working conditions of each printer. The MIB module 24 has the function of mediating such transmission and sets the address and generates diverse data transmitted to and from the MIB of the printer based on the setting data generated by the operation setting module 20.

The network input-output module 26 functions as an input-output interface that enables data transmission via the network LAN. Communication via the network allows transmission of packet data according to a predetermined protocol. The network input-output module 26 converts the data generated by the MIB module 24 into packet data transmittable via the network according to a communication protocol used for communication with the printer. The network input-output module 26 also functions to analyze the packet data transmitted from each printer and extract the substantial part from the packet data used for the processing in the management system 10. The management system 10 is provided with an NIC (Network Interface Card) as a hardware element for connection with the network LAN. The network input-output module 26 further functions as a driver of the NIC.

This embodiment regards the management system constructed to attain the respective functions in a single computer. All the functional blocks may not be included in one single computer, but main be divided into a plurality of computers that can work in cooperation. The management system 10 may also be used as a client computer.

B. Operation Setting Process

Figure 5:
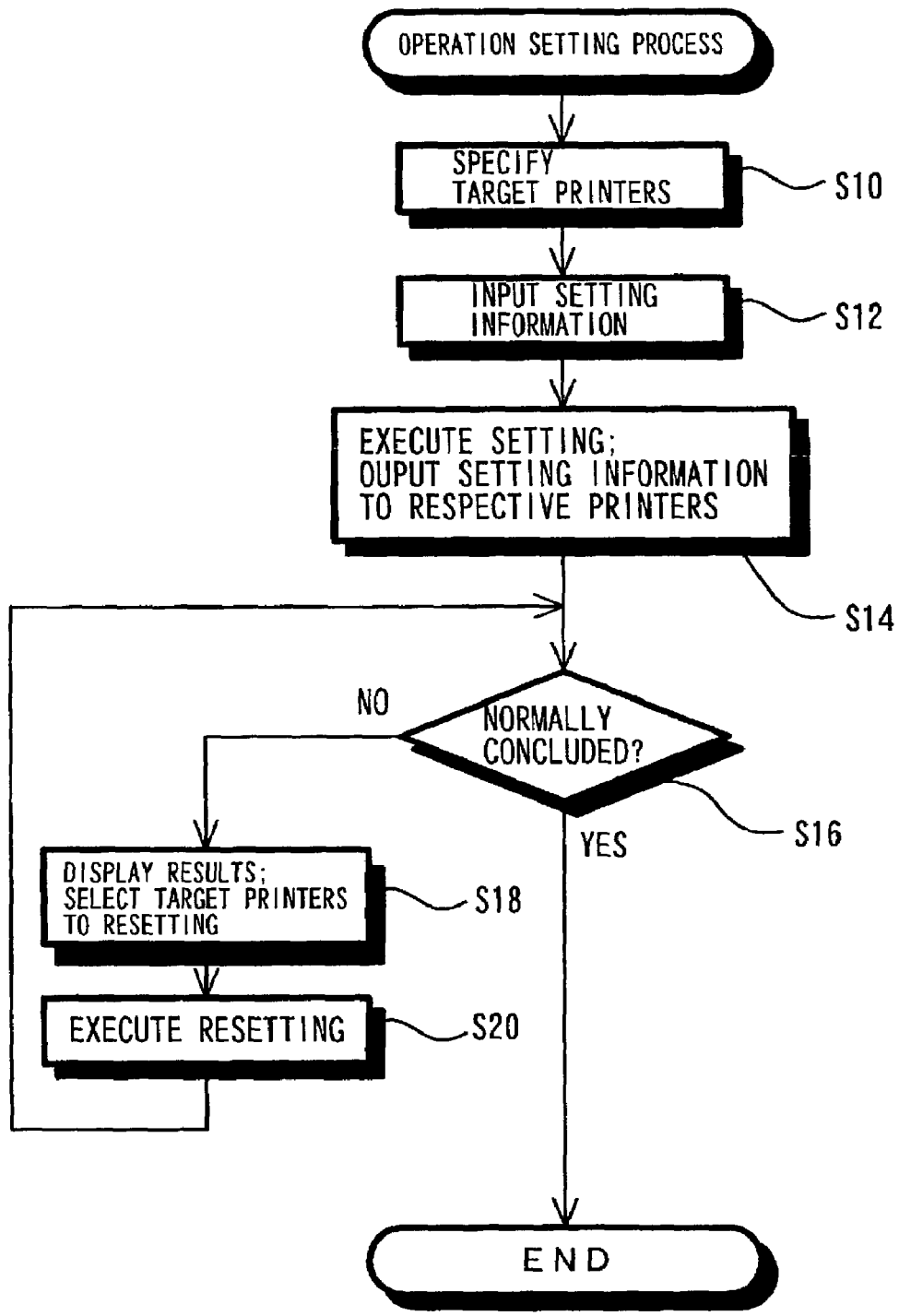
FIG. 5 is a flowchart showing an operation setting routine for setting operations of printers executed by the management system 10.

FIG. 5 is a flowchart showing an operation setting routine for setting operations of printers executed by the management system 10. The management system 10 first specifies target printers as objects of management and inputs setting information (steps S10 and S12). The manager uses the interface shown in FIG. 4 to specify the target printers.

Figure 6:
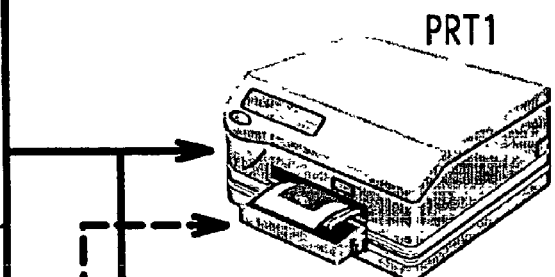
FIG. 6 shows output of setting information.
Figure 6:
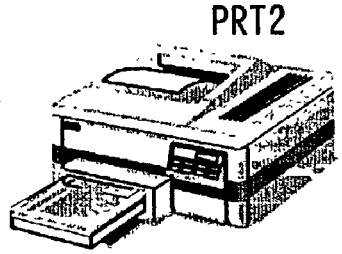
Figure 6:
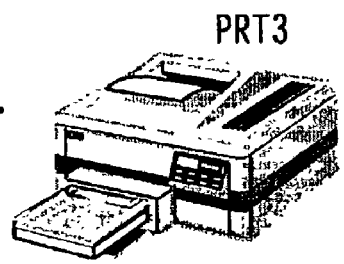

In response to a 'Setting Execute' command given by the manager, the management system 10 outputs the setting information to the target printers (step S14). FIG. 6 shows output of the setting information. As illustrated, the setting information with regard to the conditions common to the respective printers are output separately from the type-dependent setting information. The management system 10 generates a series of setting data representing the settings on the conditions common to the respective printers. The upper portion of the drawing shows the contents of the setting data. The procedure of the embodiment utilizes the MIB for the operation setting of the respective printers, so that the setting data is MIB data. The setting data includes predetermined header information, which is followed by each set of data for specifying a working condition called an object and data for specifying the setting of the object.

When 'Group A' (see FIGS. 1 and 3) is selected for the target printers, the management system 10 outputs the setting data on the common conditions to the printers PRT1 to PRT3 belonging to the group A as shown by the solid arrows in FIG. 6. The procedure of this embodiment successively changes the output resource to the printers PRT1, PRT2, and PRT3 and outputs the setting data to the respective output resources.

The procedure utilizes the MIB for setting the printer type-dependent working conditions. The data structure of the setting data on such type-dependent working conditions is thus similar to the data structure of the setting data on the common working conditions. The management system 10 outputs the setting data on each type-dependent working condition to only the target printer having the type-dependent working condition. In the case where the setting data is provided only with regard to the printer PRT1, the setting data is output only to the printer PRT1 as shown by the broken arrow in FIG. 6.

After outputting the setting information to each of the target printers, the management system 10 determines whether or not the operation setting is normally concluded in all the target printers (Step S16). The procedure of determination obtains the MIB information corresponding to the respective working conditions from each printer and determines whether or not the obtained MIB information coincide with the output setting information. The program exits from the operation setting routine when the operation setting is normally concluded in all the target printers.

Figure 7:
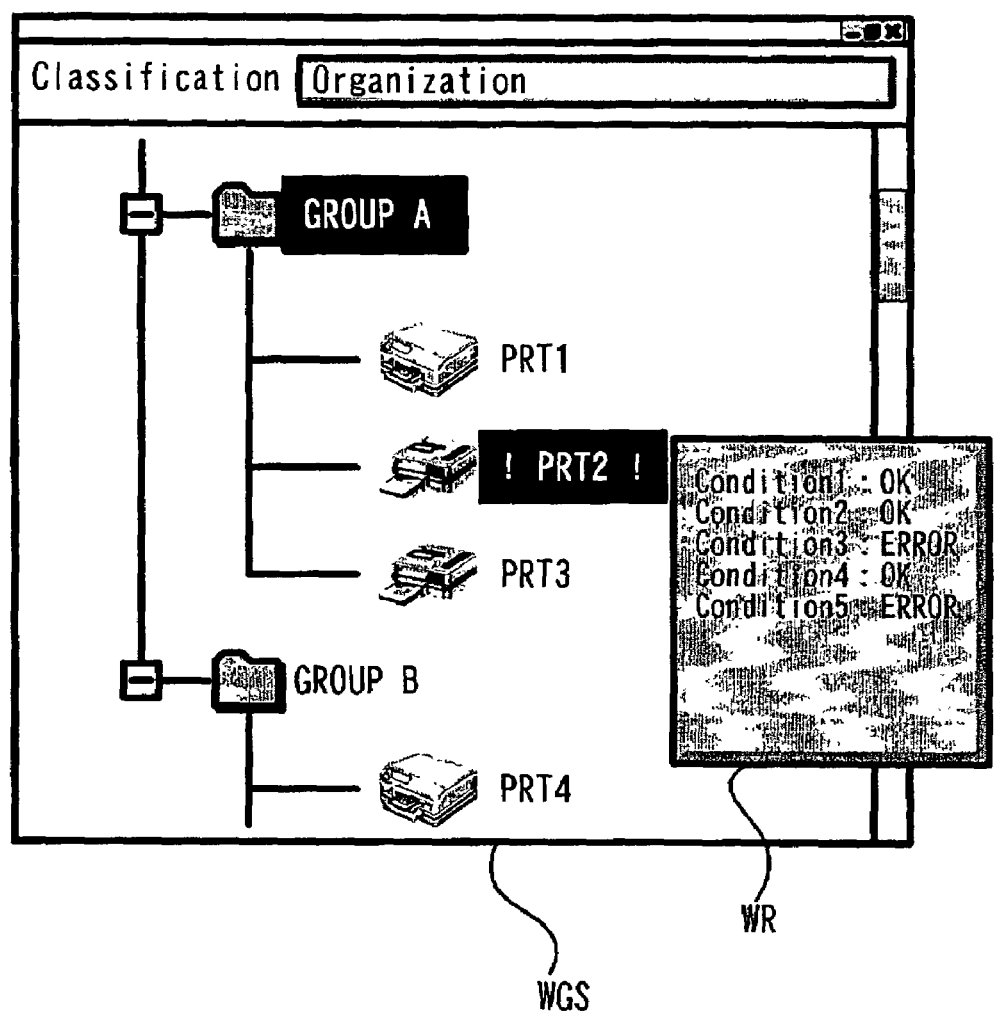
FIG. 7 shows an exemplified display as a result of the operation setting.

When there is any target printer in which the operation setting is not normally concluded, a series of resetting process is carried out as discussed below. The management system 10 displays the result of the setting and receives information on selected target printers of resetting (step S18). FIG. 7 shows an exemplified display as a result of the operation setting. The procedure of this embodiment utilizes the interface for group setting. In this example, the operation setting is not normally concluded in the printer PRT2 of the group A. As illustrated, the display shows the abnormally concluded printer PRT2 in a distinctive manner from the printers PRT1 and PRT3 among the printers PRT1 to PRT3 belonging to the group A. This embodiment gives a highlighted display of only the PRT2, although such display is not restrictive in any sense. A click or another preset operation on the abnormally concluded printer PRT2 opens a small window WR for displaying the results. The results in the window WR show normally set conditions and conditions in error state. In the example of FIG. 7, the conditions 3 and 5 in error state. The interface shown in FIG. 7 is used to select the target printer of resetting. For example, the user clicks the abnormally concluded printer PRT on the interface to give a reset command. One applicable modification does not require the manager to individually specify the target printers of resetting, but automatically sets all the abnormally concluded printers as the target printers of resetting.

In response to a manager's reset command after specification of the printer as the target of resetting, the management system 10 carries out a resetting process with regard to the specified printer (step S20). The details of the resetting process are similar to those of the setting at step S14, except that there is a restriction in printers as the possible output resources. The resetting process may transmit the setting information only on the erroneous condition among all the conditions, or may alternatively transmit the setting information on all the conditions again. The management system 10 iteratively carries out the determination of whether or not there is any abnormally concluded printer (step S16) and the resetting process (steps S18 and S20).

The management system 10 of the embodiment discussed above collectively sets the working conditions of multiple printers on the network, thus ensuring management and setting with a relatively light load. The target printers as the objects of management are classified into one or plural groups, so that the diverse operation setting is allowed for each group.

The management system of the embodiment outputs the setting information with regard to the conditions depending upon the respective types of the printers separately from the setting information with regard to the conditions common to the respective printers. This arrangement effectively reduces errors in setting. If the setting information with regard to the type-dependent conditions is output collectively with the setting information with regard to the common conditions, there is a possibility that some printers can not handle the settings of some conditions. In such cases, an error may arise even in the settings of the common conditions. The procedure of the embodiment, however, outputs the setting information with regard to the type-dependent conditions separately from the setting information with regard to the common conditions, thus ensuring the high certainty in the operation setting of the common conditions.

C. Modified Example

Figure 8:
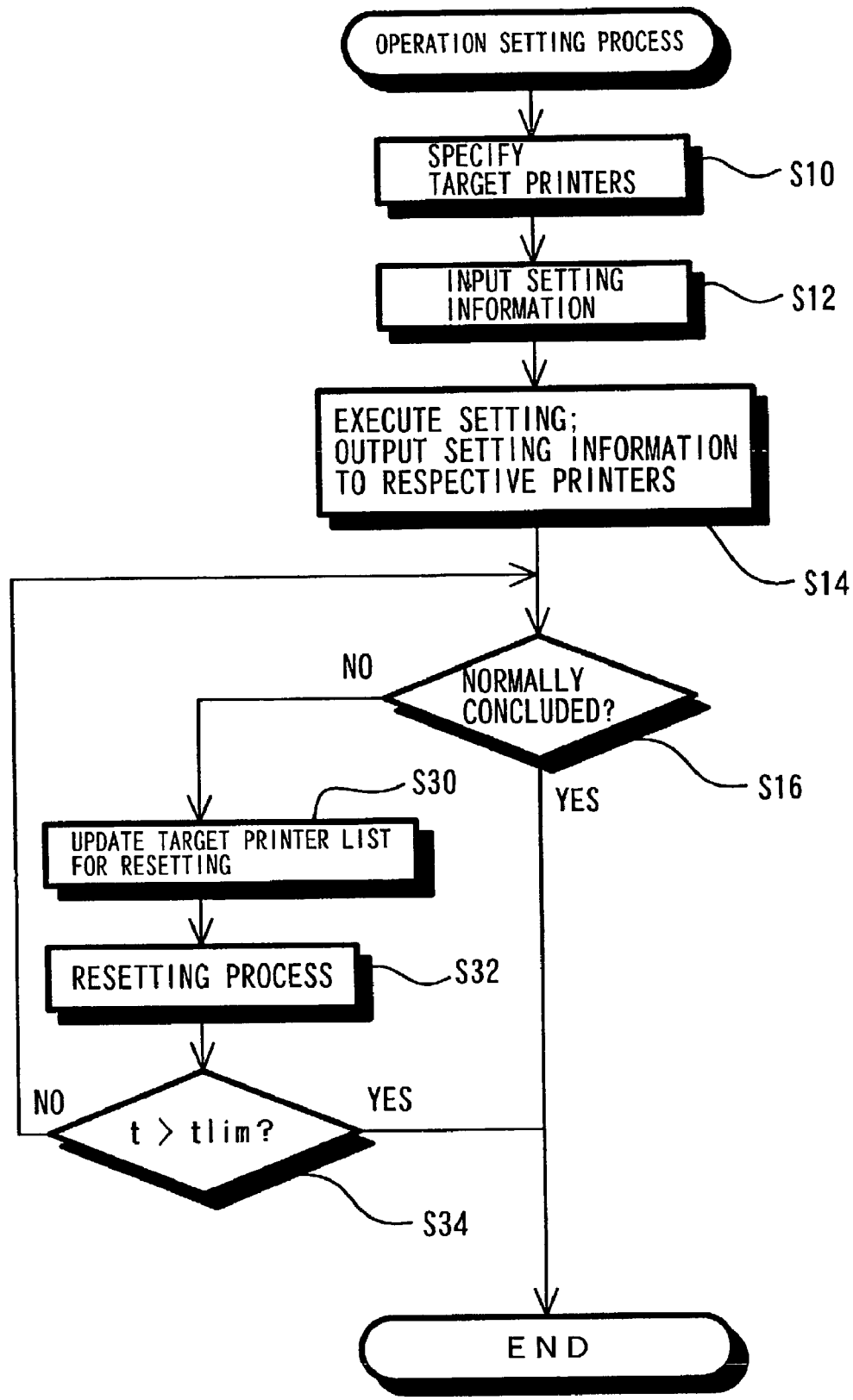
FIG. 8 is a flowchart showing an operation setting process in one modified example.

FIG. 8 is a flowchart showing an operation setting process in one modified example. In the procedure of the above embodiment, the manager determines whether or not resetting is to be carried out with regard to the abnormally concluded printer. The procedure of the modified procedure automatically carries out resetting under a predetermined condition.

In the operation setting process of the modified example, the series of processing (steps S10, S12, and S14) to specify the target printers, input the setting information, and actually execute the setting is substantially equivalent to that of the embodiment. The only difference is that the procedure of the modified example starts counting a time 't' when the setting process starts. The time 't' is used to specify time-out of a resetting process.

After execution of the setting, the management system 10 determines whether or not the setting is normally concluded in all the printers (step S16) in the same manner as the above embodiment, and carries out a resetting process when there is any abnormally concluded printer. The resetting process is carried out automatically without any operation of the manager.

In the resetting process, the management system 10 first updates a target printer list, which enumerates abnormally concluded printers (step S30). In the first cycle of the resetting process, this step newly generates a list of abnormally concluded printers. The printer enumerated in this list are target printers of resetting.

In the resetting process, the management system 10 subsequently outputs the setting information to each printer enumerated in the target printer list (step S32). The management system 10 iteratively carries out the determination of whether or not the setting process is normally concluded (step S16) and the resetting process (steps S30 and S32), until the time 't' elapsing since the start of the setting process exceeds a predetermined upper limit time tlim. The manager specifies the upper limit time tlim in advance. The resetting process is repeatedly carried out until the operation setting is normally concluded for all the printers specified as the target printers at step S10 (step S16) or the elapse of time 't' exceeds the predetermined upper limit time tlim (step S34).

The operation setting process of the modified example automatically carries out the resetting process with regard to any abnormally concluded printer, thus further relieving the load in operation setting.

D. Second Embodiment

The first embodiment regards the management system that collectively sets the working conditions of the multiple printers. A second embodiment regards a system that maintains the working conditions as well as collectively sets the working conditions.

The management system 10 of the second embodiment has the identical hardware structure and functional block configuration with those of the first embodiment. Like the first embodiment, the procedure of the second embodiment collectively sets the working conditions of the respective printers according to the operation setting process (see FIGS. 5 and 8). The difference from the first embodiment is that the procedure of the second embodiment maintains the preset working conditions according to a series of processing discussed below.

Figure 9:
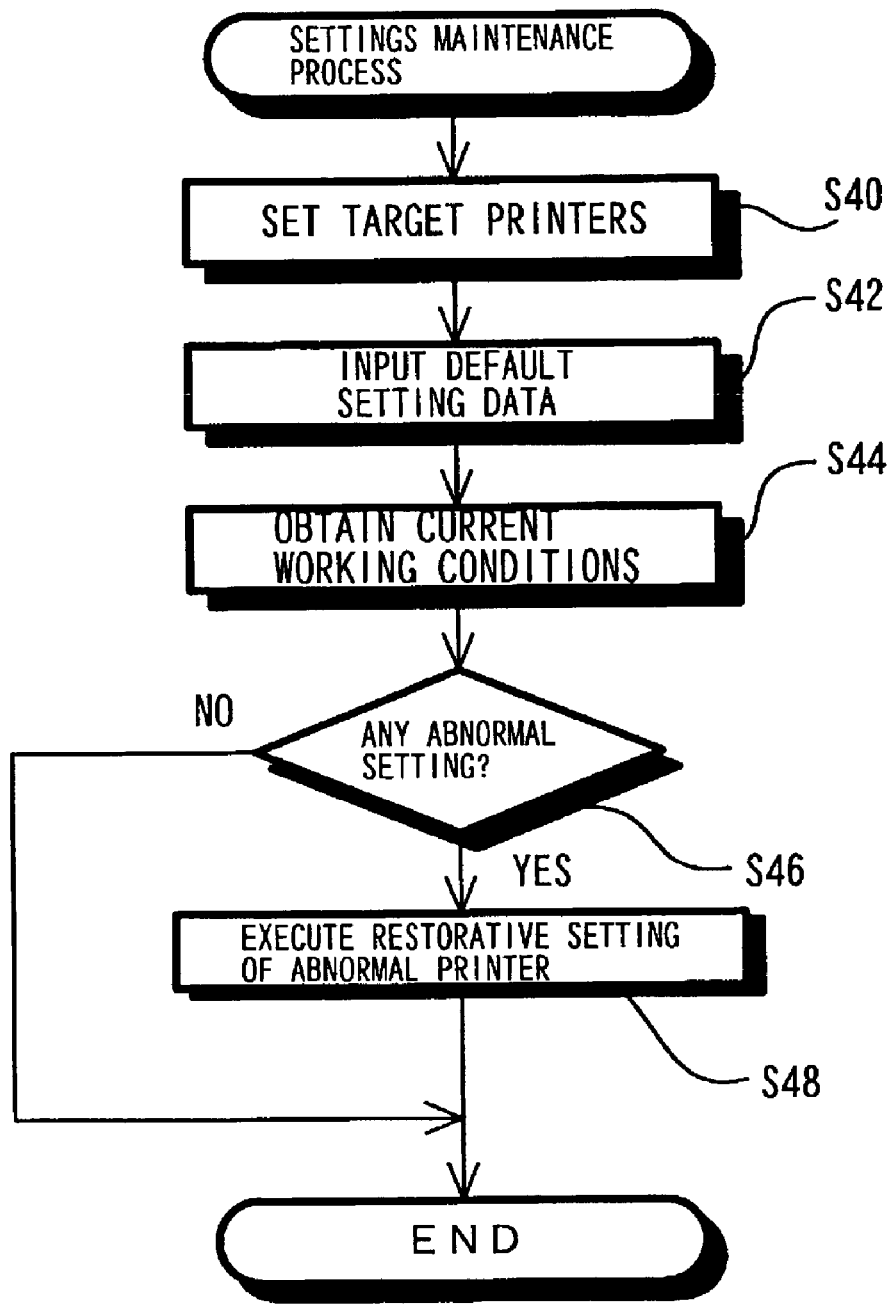
FIG. 9 is a flowchart showing a settings maintenance routine carried out in a second embodiment.

FIG. 9 is a flowchart showing a settings maintenance routine carried out in the second embodiment. When the program enters the settings maintaining routine, the management system 10 first inputs data on target printers specified as objects of settings maintenance (step S40). Like the first embodiment, the target printers may be specified by the unit of a group or individually. After specification of the target printers, the management system 10 inputs default setting data representing target working conditions to be set (step S42). In the procedure of the second embodiment, the target working conditions are stored as the default setting data in the management system 10. One possible modification may use the working conditions of the model printer on the network for the default setting data.

The management system 10 then obtains setting information representing the current working conditions of each target printer (step S44). The concrete procedure obtains the MIB information relating to the respective working conditions with regard to each target printer. The management system 10 compares the setting information thus obtained with the default setting data and determines whether or not there is any printer having the settings of the working conditions deviated from the default settings (hereinafter referred to as the abnormal setting) (step S46). When there is no printer of the abnormal setting, the program exits from the settings maintenance routine without any further processing. When there is any printer of the abnormal setting, on the other hand, the management system 10 executes restorative setting of the abnormal printer (step S48). The concrete procedure corrects the settings of the abnormal printer to the default settings. The details of the restorative setting process are identical with the setting process of the first embodiment (step S14 in FIG. 5). Namely the setting information generated based on the default setting data is output to the abnormal printer. In this case, as discussed in the first embodiment, the settings on the type-dependent working conditions are output separately from the settings on the working conditions common to all the printers.

The procedure of the second embodiment executes the restorative setting of the abnormal printer only once. The restorative setting of the abnormal printer may, however, be carried out in an iterative manner by application of the resetting process discussed in the first embodiment or the modified example. The setting and maintenance process may be executed in response to a manager's command or automatically executed at preset intervals.

The management system of the second embodiment discussed above maintains the working conditions of the printer to the preset target conditions. Even when one user changes the settings of the printer, the changed settings are restored to the default settings after some time. This desirably reduces the potential effects on other users. The management system collectively detects and sets the working conditions, while maintaining the settings of the working conditions with a significantly light load. This arrangement thus remarkably enhances the utility of the printers connecting with the network.

E. Third Embodiment

The first embodiment and the second embodiment regard the procedure of setting the working conditions of the printers. The management system may specify diverse devices other than the printers as objects of management. A third embodiment specifies displays usable on a network as objects of management.

Figure 10:
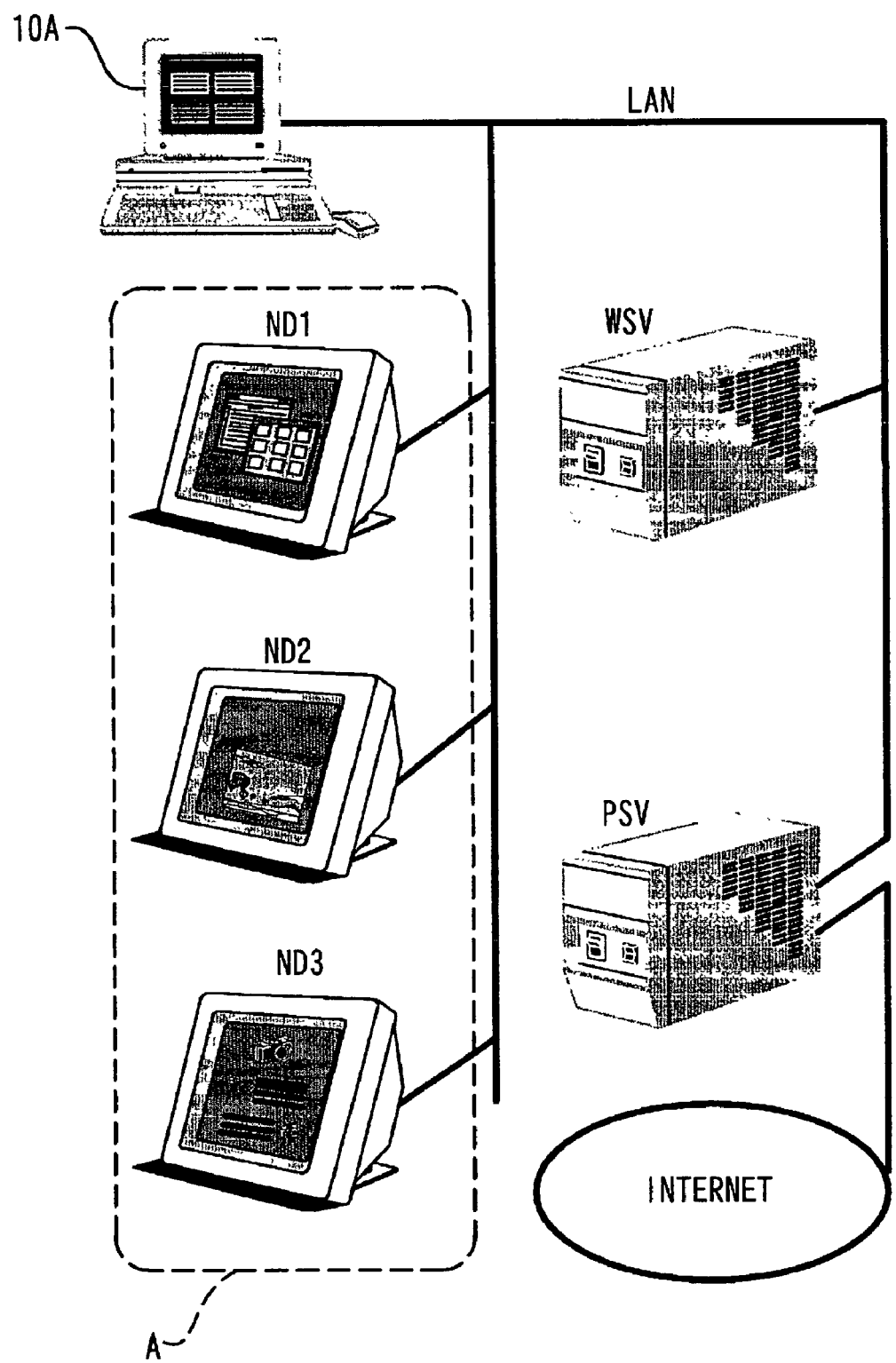
FIG. 10 illustrates the configuration of a network system including a management system 10A in a third embodiment.

FIG. 10 illustrates the configuration of a network system including a management system 10A in the third embodiment. As illustrated, displays usable on a network (hereinafter referred to as the 'network displays') ND1, ND2, and ND3 are connected to a network LAN. The network displays are capable of displaying various pieces of information supplied via the network. In the structure of the third embodiment, each of the network displays can display HTML data, which is supplied from a Web server WSV connecting with the network LAN, by a browser. The network LAN is further connected to the Internet via a proxy server PSV, so that the network displays ND1, ND2, and ND3 can display Web pages on the Internet. Each network display in the third embodiment has a touch-panel display unit and changes over the display of, for example, a Web page, through a touch operation.

The functional blocks included in the management system 10A of the third embodiment are identical with those of the first embodiment. In the third embodiment, the network displays may be classified into at least one group. In the example of FIG. 10, the network displays ND1 to ND3 belong to one group A.

The series of processing executed in the management system 10A of the third embodiment is equivalent to the series of processing executed in the preceding embodiments (see FIGS. 5, 8, and 9), except the working conditions to be set. The working conditions to be set in the third embodiment include diverse conditions corresponding to the functions of the display, for example, the URL of an initially displayed Web page, the brightness of the screen display, the sound volume, and the type of the touch panel sound.

Like the first and the second embodiments, the management system 10A of the third embodiment collectively manages the working conditions of the network displays with a relatively light load.

The third embodiment regards the system of managing network displays. A variety of other devices may be objects of the management. For example, the technique of the third embodiment may be applied to recording devices of recording media, scanners, and CD-ROM drives, as well as network equipment like routers. The working conditions to be set may be specified according to each device, and may include the user's authentication for access to each device.

F. Fourth Embodiment

In any of the first through the third embodiments, the target devices specified as the objects of management belong to an identical class of devices, for example, printers or network displays. In a fourth embodiment discussed below, the target devices specified as the objects of management are a mixture of different classes of devices.

Figure 11:
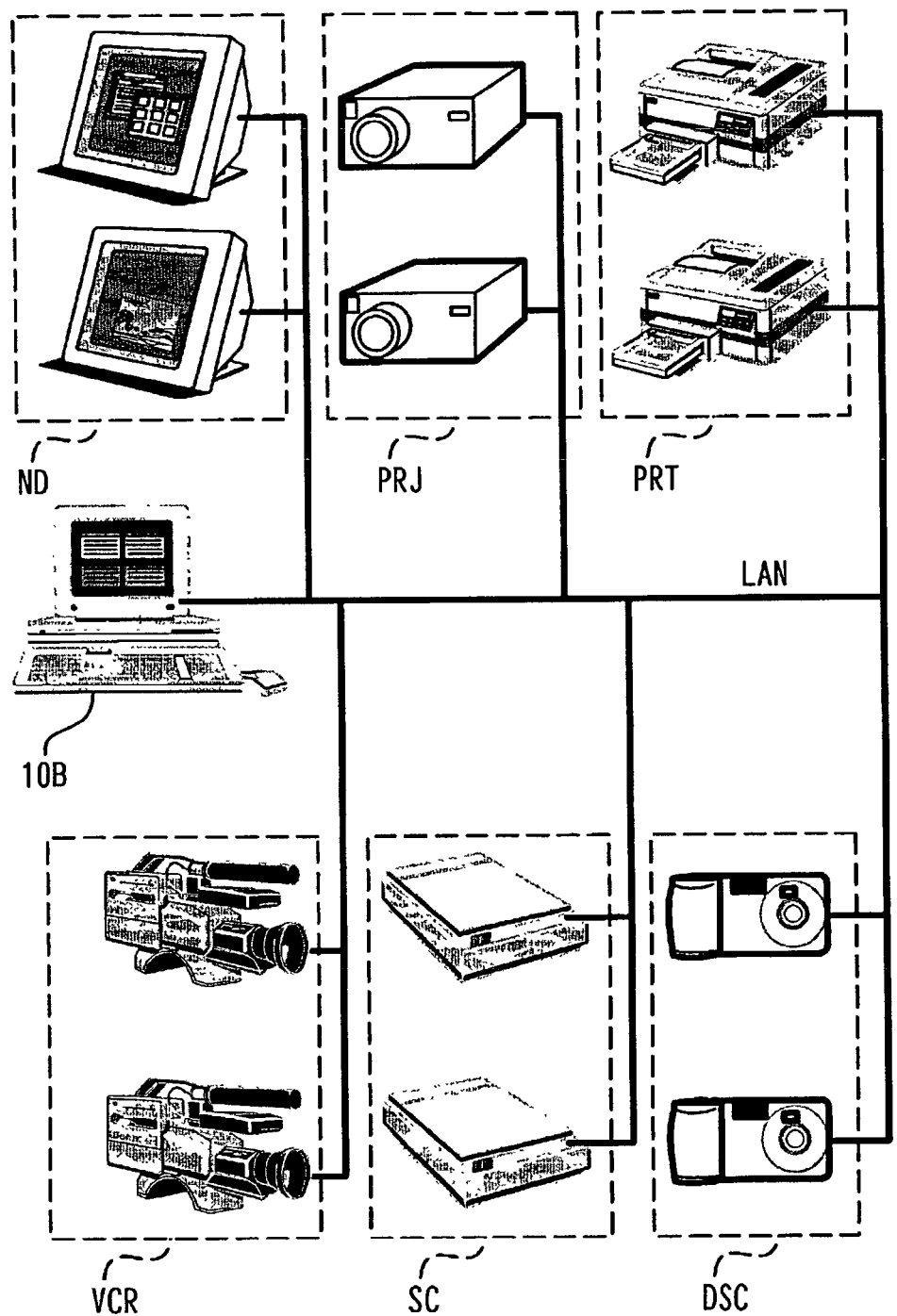
FIG. 11 illustrates the configuration of a network system including a management system 10B in a fourth embodiment.

FIG. 11 illustrates the configuration of a network system including a management system 10B in the fourth embodiment. A plurality of network displays ND, a plurality of liquid crystal projectors PRJ, and a plurality of printers PRT are connected as image output devices to a network LAN. A plurality of video cameras VCR, a plurality of scanners SC, and a plurality of digital cameras DSC are also connected as image input devices to the network LAN. The management system 10B manages the operations of the respective devices in the circumstance where different classes of devices are connected.

In the example of FIG. 11, the six different classes of devices having different main functions are connected to the network. These classes of devices are, however, not restrictive in any sense. Each class of devices may include different types of devices. The illustration of FIG. 11 only includes image input-output related devices, but the network system may include drives of diverse recording media. The connection to the network LAN may be wireless. Some devices like the digital cameras DSC may not always be connected to the network LAN, but may be specified as objects of management only when they are temporarily connected to the network LAN for the purpose of uploading or printing images.

The functional blocks included in the management system 10B of the fourth embodiment are identical with those of the first embodiment. The procedure of the fourth embodiment may manage the respective devices classified into the groups.

The series of processing executed in the management system 10B of the fourth embodiment is equivalent to the series of processing executed in the preceding embodiments (see FIGS. 5, 8, and 9), except the working conditions to be set, which depend upon the class or the type of the device.

The conditions common to the respective devices are collectively set in the dialog for setting the common conditions shown in FIG. 4. The common conditions are those related to setting and management of the network, and include the settings relating to a protocol and an address for network connection and authentication for access as well as settings relating to the manager and the owner of each device. The common conditions also include settings relating to operations, for example, the settings on the time for specifying the operations of each device, the settings on the energy saving mode, the settings on the resolutions of inputting and outputting images, and the settings on a language used in the display of an operation setting panel.

The technique of the fourth embodiment collectively manages the working conditions of the respective devices with a relatively light load.

The first through the fourth embodiments regard applications of mainly specifying the operations. The working conditions of the respective devices are readily obtained by referring to the MIB information. The management system thus collectively obtains the working conditions of the respective devices and readily determines whether or not the large number of devices work normally. The technique is also applicable for accounting in use of the respective devices.

The above embodiments are to be considered in all aspects as illustrative and not restrictive. There may be many modifications, changes, and alterations without departing from the scope or spirit of the main characteristics of the present invention.

INDUSTRIAL APPLICABILITY

The technique of the present invention is applied for management of devices connecting with a network.

The invention claimed is:

1. A management system that manages working conditions of multiple devices connecting with a network, said management system comprising:
    a target device specification module that specifies a plurality of target devices, which are objects of management of the working conditions, among the multiple devices;
    a setting module that sets management control information for obtaining or setting the working condition of each of the target devices; and
    an operation management module that outputs the management control information to each of the target devices via the network and collectively obtains or sets the working conditions of the plurality of target devices,
    wherein the plurality of target devices include different classes of devices having different obtainable or settable conditions, and
    said operation management module outputs a part of the management control information regarding a condition common to all the plurality of target devices separately from a residual part of the management control information regarding a residual non-common condition.

2. A management system in accordance with claim 1, wherein the plurality of target devices include different classes of devices having different main functions.

3. A management system in accordance with claim 1, wherein the common condition includes at least either of a setting on communication via the network and a setting on time for defining an operation of each device.

4. A computer program embodied on a computer readable medium, the computer program actualizing working conditions of multiple devices connecting with a network on a computer connecting with the network, said computer program comprising:
    a program for specifying a plurality of target devices, which are objects of management of the working conditions, among the multiple devices;
    a program for setting management control information for obtaining or setting the working condition of each of the target devices; and
    a program for outputting a part of the management control information regarding a condition common to all the plurality of target devices separately from a residual part of the management control information regarding a residual non-common condition, to each of the target devices via the network and collectively obtaining or setting the working conditions of the plurality of target devices.

5. A computer implemented method of managing working conditions of multiple devices connecting with a network, said method comprising:

(a) specifying a plurality of target devices, which are objects of management of the working conditions, among the multiple devices;

(b) setting management control information for obtaining or setting the working condition of each of the target devices; and (c) outputting a part of the management control information using a computer regarding a condition common to all the plurality of target devices separately from a residual part of the management control information regarding a residual non-common condition, to each of the target devices via the network and collectively obtaining or setting the working conditions of the plurality of target devices.

* * * * *